United States Patent
Hisha et al.

(10) Patent No.: US 8,067,500 B2
(45) Date of Patent: Nov. 29, 2011

(54) CURABLE COMPOSITION, BONDING METHOD AND ASSEMBLY

(75) Inventors: Yuki Hisha, Shibukawa (JP); Kimihiko Yoda, Shibukawa (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 145 days.

(21) Appl. No.: 12/529,131

(22) PCT Filed: Feb. 28, 2008

(86) PCT No.: PCT/JP2008/053542
§ 371 (c)(1),
(2), (4) Date: Aug. 28, 2009

(87) PCT Pub. No.: WO2008/108273
PCT Pub. Date: Sep. 12, 2008

(65) Prior Publication Data
US 2010/0068540 A1   Mar. 18, 2010

(30) Foreign Application Priority Data
Mar. 2, 2007   (JP) .................................. 2007-052221

(51) Int. Cl.
*C08F 220/28* (2006.01)
*C08F 2/44* (2006.01)
*C08F 220/30* (2006.01)
*C08L 79/02* (2006.01)

(52) U.S. Cl. ........ 525/191; 525/192; 525/221; 525/222; 525/240

(58) Field of Classification Search .................. 525/191, 525/192, 221, 222, 240
See application file for complete search history.

(56) References Cited

U.S. PATENT DOCUMENTS

| | | | |
|---|---|---|---|
| 3,591,438 A | 7/1971 | Toback et al. | |
| 3,625,930 A | 12/1971 | Toback et al. | |
| 5,243,069 A * | 9/1993 | Emmons | 560/224 |

FOREIGN PATENT DOCUMENTS

| | | |
|---|---|---|
| GB | 715 382 | 9/1954 |
| JP | 52 18478 | 2/1977 |
| JP | 5 125331 | 5/1993 |
| JP | 5-287250 | 11/1993 |
| JP | 9 53051 | 2/1997 |
| JP | 2001 261723 | 9/2001 |
| JP | 2001 261724 | 9/2001 |
| JP | 2002 338610 | 11/2002 |
| JP | 2003 105009 | 4/2003 |
| JP | 2003 165806 | 6/2003 |

OTHER PUBLICATIONS

Office Action issued May 18, 2011 in Korea Applicatino No. 10-2009-7015766 (With English Translation).

* cited by examiner

*Primary Examiner* — Nathan M Nutter
(74) *Attorney, Agent, or Firm* — Oblon, Spivak, McClelland, Maier & Neustadt, L.L.P.

(57) ABSTRACT

A curable composition and an adhesive which exhibit a temporarily fixing effect very quickly and which are completely cured quickly at room temperature, and a bonding method using such a composition. The curable composition including a component (A)], which is a polymerizable acrylic liquid composition, a component (B), which is cumene hydroperoxide, a component (C), which is a reducing agent containing vanadium or copper, or a reducing agent comprising ethylene thiourea, and a component (D), which is a basic compound having a primary, secondary, or tertiary amine structure.

20 Claims, No Drawings

CURABLE COMPOSITION, BONDING METHOD AND ASSEMBLY

TECHNICAL FIELD

The present invention relates to a curable composition which is an acrylic curable composition excellent in high speed curing properties, and which is easily cured at a high speed at room temperature for strong bonding. The invention also relates to an adhesive, a bonding method, and an assembly. Particularly, it relates to a curable composition, an adhesive with the composition, a bonding method using the composition, and an assembly bonded by the composition wherein the composition is suitably applied to furniture made of a steel plate, office articles, etc.

BACKGROUND ART

Heretofore, an acrylic resin has been widely used in the fields of molding materials, coating compositions, adhesives, etc., in view of its good durability and environmental friendliness, among other things.

An acrylic adhesive is used for bonding by polymerizing and curing an acrylic monomer or oligomer utilizing an organic peroxide and a reducing agent which decomposes the organic peroxide to generate radicals, which function as a polymerization initiator.

A combination of an organic peroxide with a reducing agent is generally called "a curing initiator system". Further, a "two-pack type acrylic adhesive" is an acrylic adhesive comprising two agents of (A) a composition containing an organic peroxide and (B) a composition containing a reducing agent, and it is also called a two liquid chief agent type adhesive since the two agents (A) and (B) are in the form of a liquid in most cases.

The two-pack type acrylic adhesive is used for a method of mixing the above two agents (A) and (B) immediately before use and applying the mixture to an object to be bonded, and a method of applying the above (A) to a surface of one object to be bonded and applying the above (B) on a surface of the other object to be bonded, and contacting both surfaces.

Cumene hydroperoxide, which can be used for (A), is an organic hydroperoxide having a hydroperoxide group, and is commonly used by virtue of a long half-life at room temperature.

The reducing agent, which can be used for (B) is roughly classified as a mixture of an ethylene thiourea derivative with a metallic soap or a mixture of an ethylene thiourea derivative with a metal chelate compound. An adhesive using such a reducing agent, which is cured at a high speed at room temperature as compared with an epoxy adhesive, has been developed (Patent Documents 1 to 4).

However, even with such a reducing agent, no adhesive which is cured in seconds at room temperature while maintaining adhesive characteristics ultimately required, has been realized. Accordingly, a temporary fixing jig is used for the purpose of preventing misalignment in the bonding position or falling, during the period from bonding till fixing by curing, at present. When using an acrylic adhesive at the present state of the art, a lot of temporary fixing jigs must be used in the bonding site. Therefore, for example, productivity in production of steel plate products cannot be improved, thereby preventing the cost reduction.

An adhesive which can bond an object at a determined position without use of a temporarily fixing jig, which overcomes the above problem, has been strongly desired.
Patent Document 1: JP-A-52-018478
Patent Document 2: U.K. Patent No. GB 715382
Patent Document 3: U.S. Pat. No. 3,591,438
Patent Document 4: U.S. Pat. No. 3,625,930

DISCLOSURE OF THE INVENTION

Object to be Accomplished by the Invention

The present invention has been made to overcome the above problems of prior art, and its object is to provide a curable composition and an adhesive which exhibit a temporarily fixing effect very quickly and which are completely cured quickly at room temperature while maintaining excellent characteristics of an acrylic adhesive. A further of the invention is to provide a bonding method employing the above composition or adhesive.

Means to Accomplish the Above Object

The present invention provides the following.
1. A curable composition which comprises the following components (A), (B), (C) and (D):
   component (A) is a polymerizable acrylic monomer,
   component (B) is cumene hydroperoxide,
   component (C) is a reducing agent containing vanadium or copper or a reducing agent comprising ethylene thiourea, and
   component (D) is a basic compound having a primary, secondary or tertiary amine structure.
2. The curable composition according to the above 1, wherein the component (A) is a mixture of a hydroxyalkyl (meth) acrylate and a phenoxyalkyl (meth)acrylate.
3. The curable composition according to the above 1 or 2, wherein the basic compound as the component (D) is a compound having a main chain of which the skeleton is ethyleneimine.
4. The curable composition according to the above 1 or 2, wherein the basic compound as the component (D) is a polyethyleneimine having a number average molecular weight of from 50 to 70,000.
5. The curable composition according to any one of the above 1 to 4, which comprises 100 parts by mass of the component (A), from 0.1 to 10 parts by mass of the component (B), from 0.04 to 5 parts by mass of the component (C) and from 0.5 to 10 parts by mass of the component (D).
6. The curable composition according to any one of the above 1 to 5, which further contains from 5 to 40 parts by mass of an elastomer as a component (E) per 100 parts by mass of the total of the component (A) and the component (E).
7. A bonding method employing the curable composition as defined in any one of the above 1 to 5, which comprises applying either agent P containing the components (A) and (B) or agent Q containing the components (A), (C) and (D) on a surface of one object to be bonded; applying the other of the agent P or the agent Q on a surface of the other object to be bonded; and contacting both surfaces, followed by curing.
8. A bonding method employing the curable composition as defined in any one of the above 1 to 5, which comprises applying an agent P containing the components (A) and (B) and an agent R containing the components (A) and (C) on a surface of one object to be bonded; applying an agent S containing the component (D) on either the above surface or a surface of the other object to be bonded; and contacting both surfaces, followed by curing.

9. An assembly, which is produced by bonding surfaces of two objects by the bonding method as defined in the above 7 or 8, wherein the surfaces are made of copper.

Effects of the Invention

The curable composition of the present invention, which has the above composition, can product a polymerizable acrylic liquid composition that exhibits a temporary fixing effect so quickly as to be substantially instantaneous at room temperature. Accordingly, by using it for a so-called multi-liquid adhesive, an adhesive which is quickly cured at room temperature can be provided.

Further, the curable composition of the present invention exhibits a temporary fixing effect quickly at room temperature and is cured in minutes as described above, and accordingly when it is used as an adhesive, the temporary fixing jig which has been used is no longer necessary. For example, productivity in production of steel plate products can be improved, which contributes to a reduction in the production cost in various fields.

In the bonding method of the present invention, the order of combination of the components (A), (B), (C) and (D) in the above curable composition is selected such that it is possible to let the curing of the composition proceed step-by-step.

For example, a coated surface comprising agent P and agent R, subsequently described, is formed on a surface of one object to be bonded, so that the curing proceeds gradually, and finally, the coated surface is contacted with the subsequently-mentioned agent S applied to a surface of the other object to be bonded, whereupon both the coated layers are rapidly cured, and whereby the pot life in the bonding operation can be adjusted to the production line. An assembly to be obtained by such a bonding method is bonded without misalignment in the position, maintains sufficient bonding strength, and, in addition, is excellent in the outward appearance.

BEST MODE FOR CARRYING OUT THE INVENTION

In the present invention, the component (A) is a polymerizable acrylic monomer. Among acrylic monomers, preferred is an acrylic liquid monomer.

Here, the acrylic monomer collectively means a methacrylate and an acrylate (hereinafter referred to as a (meth)acrylate). It may, for example, be methyl (meth)acrylate, ethyl (meth)acrylate, propyl (meth)acrylate, butyl (meth)acrylate, 2-ethylhexyl (meth)acrylate, isooctyl (meth)acrylate, isodecyl (meth)acrylate, lauryl (meth)acrylate, stearyl (meth)acrylate, phenyl (meth)acrylate, cyclohexyl (meth)acrylate, dicyclopentanyl (meth)acrylate, dicyclopentenyl (meth)acrylate, isobornyl (meth)acrylate, methoxylated cyclotriene (meth)acrylate, dicyclopentenyloxyethyl (meth)acrylate, 2-hydroxyethyl (meth)acrylate, 2-hydroxypropyl (meth)acrylate, 3-hydroxypropyl (meth)acrylate, 4-hydroxybutyl (meth)acrylate, polyethylene glycol (meth)acrylate, alkyloxypolypropylene glycol (meth)acrylate, tetrahydrofurfuryl (meth)acrylate, 2-hydroxy-3-phenoxypropyl (meth)acrylate, phenoxyethyl (meth)acrylate, phenoxypropyl (meth)acrylate, phenoxybutyl (meth)acrylate, glycidyl (meth)acrylate, caprolactone-modified tetrafurfuryl (meth)acrylate, ethoxycarbonylmethyl (meth)acrylate, phenol ethylene oxide-modified acrylate, p-cumylphenol ethylene oxide-modified acrylate, nonylphenol ethylene oxide-modified acrylate, nonylphenol polypropylene oxide-modified acrylate, 2-ethylhexylcarbitol acrylate, polyglycerol di(meth)acrylate, polybutylene glycol di(meth)acrylate, 1,4-butanediol (meth)acrylate, 1,6-hexanediol di(meth)acrylate, neopentyl glycol di(meth)acrylate, trimethylolpropane tri(meth)acrylate, epoxy (meth)acrylate ("VISCOAT #540" manufactured by OSAKA ORGANIC CHEMICAL INDUSTRY LTD.), polyester (meth)acrylate ("ARONIX M-6100" manufactured by TOAGOSEI CO., LTD., "Epoxyester 3000M" manufactured by Kyoeisha Chemical Co., Ltd.), urethane acrylate ("ARONIX M-1100" manufactured by TOAGOSEI CO., LTD.), polyethylene glycol urethane-modified di(meth)acrylate, polypropylene glycol urethane-modified di(meth)acrylate, epoxy acrylate ("ARONIX M-5710" manufactured by TOAGOSEI CO., LTD.), polybutadiene dimethacrylate ("TE-2000", manufactured by Nippon Soda Co., Ltd.), acrylonitrile butadiene methacrylate ("HyCAr VTBNX" manufactured by Ube Industries, Ltd.) or an acrylic oligomer ("BPE500" manufactured by SHIN-NAKAMURA CHEMICAL CO., LTD.).

The above acrylic monomers may be used as a mixture of two or more of them for the purpose of adjusting physical properties of a cured product, but of coarse, they may be used alone. Further, for the component (A), a rubber component, a cyclopentadiene resin, a petroleum resin ("Neopolymer S" manufactured by Nippon Oil Corporation, "ARKON" manufactured by Arakawa Chemical Industries, Ltd.), etc. may be mixed for the purpose of improving characteristics. Further, a paraffin wax may be added for the purpose of imparting quick surface drying properties. Further, a filler such as an organic filler may be added for the purpose of improving fluidity or the like. Further, a silane coupling agent or the like may be added for the purpose of improving characteristics. Still further, an antioxidant or the like may be added for the purpose of improving storage stability.

As the component (A), it is preferred to use a hydroxyalkyl meth(acrylate) such as 2-hydroxyethyl meth(acrylate), 2-hydroxypropyl meth(acrylate), 3-hydroxypropyl meth(acrylate), or 4-hydroxybutyl meth(acrylate) with a phenoxyalkyl meth(acrylate) such as phenoxyethyl meth(acrylate), phenoxypropyl meth(acrylate), or phenoxybutyl meth(acrylate) in combination. Particularly, the mixing ratio (mass ratio) of the hydroxyalkyl meth(acrylate) to the phenoxyalkyl meth(acrylate) is preferably 5 to 80:95 to 20, and more preferably 10 to 60:90 to 40.

In the component (A), the ratio of the mixture of the hydroxyalkyl meth(acrylate) to the phenoxyalkyl meth(acrylate) is preferably from 10 to 90 mass %, more preferably from 20 to 85 mass %, and most preferably from 30 to 60 mass %.

The content of the cumene hydroperoxide as the component (B) is preferably from 0.1 to 10 parts by mass, and more preferably from 1 to 8 parts by mass, per 100 parts by mass of the component (A). When it is at least 0.1 part by mass, curing failure will not occur, and when it is at most 10 parts by mass, an increase in the skin irritancy or a decrease in the storage stability will not occur.

The reducing agent containing vanadium or copper or the reducing agent comprising ethylene thiourea as the component (C) is a reducing agent which decomposes the component (B) and generates radicals, and it may, for example, be vanadyl acetylacetonate, copper naphthenate, or ethylene thiourea. As such a reducing agent, various forms from a liquid to a solid are available, and one which is easily handled may be used.

The amount of the component (C) is preferably from 0.04 to 5 parts by mass, and more preferably from 0.08 to 2.0 parts by mass, per 100 parts by mass of the component (A). When the amount is at least 0.04 part by mass, the curing will not be slow. The upper limit is not particularly defined from the technical viewpoint, but even if it exceeds 5 parts by mass, no improvement in performance will be achieved, such being not advisable in view of the cost effectiveness.

The basic compound having a primary, secondary, or tertiary amine structure as the component (D) is a material which reacts with the reducing agent to decompose the organic peroxide at a high speed and thereby exhibits a function to quickly cure the adhesive. It may, for example, be a polyethyleneimine, a modified polyethyleneimine (manufactured by NIPPON SHOKUBAI CO., LTD.), N,N-dimethylaniline, modified dihydropyridine, 2-methylimidazole, 2-hydroxyethyl p-toluidine, ethanolamine, diethanolamine, diethylethanolamine, methyldiethanolamine, butyldiethanolamine, diethylamine, triethylamine, n-butylamine, 2,2-bipyridine, 1,10-phenanthroline, ammonia, alkylidene malonate, δ-iminomalonate, ethylazan, phenylamine, benzylamine, 1-benzofuran-2-amine, 4-quinolylamine, pentane-1,2,5-triamine, benzene-1,2,4,5-tetramine, bis(2-chloroethyl)amine, butyl(ethyl)methylamine, (2-chloroethyl)(propyl)amine, hexane-1-imine, isopropylidene amine, ethane-1,2-diimine, carbodiimide, o-acetylhydroxyamine, o-carboxyhydroxylamine, hydroxylamine-o-sulfonic acid, o-hydroxyaniline, phenylpropanolamine hydrochloride, catecholamine, indoleamine, or polyacrylamine.

The component (D) is preferably a polyethyleneimine having an amine value of preferably from 5 to 25 mmol/g-solid in one molecule from the viewpoint of high speed curing properties.

The number average molecular weight of the polyethyleneimine is from 50 to 70,000, and more preferably from 200 to 800.

The component (D) may be used as a mixture of two or more of them for the purpose of improving the handling efficiency and the performance, and its amount is preferably from 0.5 to 10 parts by mass, more preferably from 2 to 8 parts by mass, per 100 parts by mass of the component (A). When it is at least 0.5 part by mass, the curing rate will be sufficient since the composition will be cured within several tens seconds, and when it is at most 10 parts by mass, the final strength will not be low.

In the present invention, to further improve the adhesion, it is preferred to further use an elastomer as a component (E). An elastomer is a polymer material having rubber-like elasticity at room temperature, and is preferably soluble or dispersible in a polymerizable vinyl monomer.

Such an elastomer may, for example, be a synthetic rubber such as acrylonitrile/butadiene rubber (NBR rubber), a linear polyurethane, styrene/butadiene rubber, chloroprene rubber or butadiene rubber; a natural rubber; a styrene thermoplastic elastomer such as styrene/polybutadiene/styrene synthetic rubber; or an olefin thermoplastic elastomer such as polystyrene/EPDM (an ethylene/propylene/conjugated diene copolymer) synthetic rubber. Such elastomer components may be used alone or as a mixture of two or more of them so long as they are miscible.

Among them, preferred is acrylonitrile/butadiene rubber in view of good solubility in a polymerizable acrylic liquid composition and good adhesive properties.

The amount of use of the component (E) is preferably from 5 to 40 parts by mass, more preferably from 10 to 35 parts by mass per 100 parts by mass of the total of the component (A) and the component (E).

With respect to the composition of the present invention, initiation of curing can be controlled by e.g. a method of forming all the three components (B), (C), and (D) into one agent, or a method of separating one component from an agent comprising the other two components.

The present inventors have conducted extensive studies and as a result, they have found that the following method (1) or (2) is very excellent in workability and is application to various uses, and they have accomplished the present invention.

(1) A method of using an agent P containing the components (A) and (B) and an agent Q containing the components (A), (C), and (D).

(2) A method of using an agent P containing the components (A) and (B), an agent R containing the components (A) and (C) and an agent S containing the component (D) in combination.

The method (1) is a method generally called "honeymoon bonding", and is a method of applying either agent P or agent Q on a surface (bonding surface) of one object to be bonded, applying the other of the agent P or the agent Q on a surface (bonding surface) of another object to be bonded, and contacting both surfaces, followed by curing reaction.

The above bonding method (1) using the agents P and Q provides an adhesive suitable for a case where the bonding operation is carried out with high productivity, since both agents are instantaneously cured and bonded after contacted.

The method (2) is a bonding method using the above agents P, R and S. In this method, first, the agents P and R are used to form a coated surface on a surface (bonding surface) of one object to be bonded, but since the component (D) is not contained in these agents, theses agents are not instantaneously cured. Then, the component (D) as the agent S is applied on the above surface or a surface (bonding surface) of the other object to be bonded, whereby the curing reaction quickly proceeds from the point where both the liquid agents are mixed, and curing in a short time is achieved. That is, since initial fixing properties can be imparted, a large number of jigs which have been required for position fixing are no longer necessary.

When the bonding method (2) is applied to bonding of objects to be bonded having surfaces made of steel, such as bonding of steel plates, the pot life in the bonding operation can be adjusted to the production line. In such a case, an assembly to be obtained is bonded without misalignment in the position, maintains sufficient bonding strength. In addition, it is excellent in outward appearance, and is particularly suitable for furniture made of a steel plate or office articles.

To the curable composition or the adhesive of the present invention, or the above agent P, Q, R, or S, a small amount of an antioxidant may be added for the purpose of improving the storage stability of the organic peroxide. For example, a phenolic antioxidant such as hydroquinone, pyrogallol, or monomethylhydroquinone; p-benzoquinone; citric acid or the like may be blended as the antioxidant.

Among them, the antioxidant is preferably p-benzoquinone, hydroquinone, citric acid or the like. The content of the antioxidant is preferably from 0.001 to 1.0 part by mass, more preferably from 0.005 to 0.2 part by mass per 100 parts by mass of the component (A).

Further, for the purpose of improving fluidity or the like, a bulking agent, such as high purity ultrafine silica powder may be added to an extent such that the storage stability is not impaired.

Further, for the purpose of improving characteristics, a silane coupling agent, an amine salt of (meth)acrylate ethanol phosphate or the like may be added.

Still further, in the case of use as a high speed fixing primer, it may be diluted with a safe solvent such as ethanol or isopropyl alcohol.

To the curable composition of the present invention, further, a small amount of an adhesion-imparting agent may be added. The adhesion-imparting agent may, for example, be γ-chloropropyltrimethoxysilane, vinyl trimethoxysilane, vinyltrichlorsilane, vinyl triethoxysilane, vinyl tris(β-methoxyethoxy)silane, γ-methacryloxypropyltrimethoxysilane, γ-acryloxypropyltrimethoxysilane, β-(3,4-epoxycylcohexyl) ethyltrimethoxysilane, γ-glycidoxypropyltrimethoxysilane, γ-mercaptopropyltrimethoxysilane, γ-aminopropyltriethoxysilane, N-β-(aminoethyl)-γ-aminopropyltrimethoxysilane, N-β-(aminoethyl)-γ-aminopropylmethyldimethoxysilane, γ-ureidopropyltriethoxysilane, hydroxyethyl methacrylate phosphate, methacryloxyethyl acid phosphate, or methacryloxyethyl acid phosphate monoethylamine half salt 2-hydroxyethylmethacrylate phosphate.

The content of the adhesion-imparting agent is preferably from 0.05 to 5.0 parts by mass, and more preferably from 0.2 to 2.5 parts by mass, per 100 parts by mass of the component (A).

EXAMPLES

Now the present invention will be described in further detail with reference to Examples and Comparative Examples. However, it should be understood that the present invention is by no means restricted to such specific Examples.

Physical properties were measured by the following methods.
(Bonding Strength)
Bonding test specimen: iron (SPCC manufactured by Test Piece)
Surface treatment of bonding test specimen: degreased with acetone and subjected to 150 mesh sand blasting
Iron/iron tensile shear strength: measured in accordance with JIS K-6855
(Temporarily Fixing Effect Confirmation Test)
Bonding test specimen: large iron block (200 g) (width×length×thickness: 25×45×20 mm, the same applies hereinafter) and small iron block (50 g) (25×25×8 mm)
Surface treatment of bonding test specimen: degreased with acetone and subjected to 150 mesh sand blasting
After bonding, misalignment in the position by its own weight was observed to confirm the temporarily fixing effect.
(Bonding Time)
One end of an iron test specimen (25.4 mm×100 mm: width×length) having a flat surface was bonded in an atmosphere at 23° C. with a wrap length of 25.4 mm, and after bonding, the time at which the test specimen no more moved under a load of 100 g was measured and regarded as the bonding time.

Example 1

Preparation of Agent P (Components A and B)

25 g of 2-hydroxyethyl methacrylate ("LIGHT ESTER HO" manufactured by Kyoeisha Chemical Co., Ltd.), 17 g of 2-hydroxypropyl methacrylate ("LIGHT ESTER HOP" manufactured by Kyoeisha Chemical Co., Ltd.), 35 g of phenoxyethyl methacrylate ("LIGHT ESTER PO" manufactured by Kyoeisha Chemical Co., Ltd.), 9 g of an acrylic oligomer ("BPE500" manufactured by SHIN-NAKAMURA CHEMICAL CO., LTD.) and 1 g of paraffin wax (manufactured by NIPPON SEIRO CO., LTD.) were heated to 70° C. with stirring and mixing, and after the paraffin wax was melted, the mixture was cooled to 25° C. Then, 13 g of NBR rubber ("DN612P" manufactured by ZEON CORPORATION) was mixed and dissolved, and 1 g of CIT (citric acid), 0.05 g of PBQ (p-benzoquinone) and 5 g of cumene hydroperoxide ("PERCUMYL H80" manufactured by NOF CORPORATION) were added, followed by mixing and stirring to obtain an agent P.

Preparation of Agent Q (Components A, C and D)

25 g of 2-hydroxyethyl methacrylate ("LIGHT ESTER HO" manufactured by Kyoeisha Chemical Co., Ltd.), 17 g of 2-hydroxypropyl methacrylate ("LIGHT ESTER HOP" manufactured by Kyoeisha Chemical Co., Ltd.), 35 g of phenoxyethyl methacrylate ("LIGHT ESTER PO" manufactured by Kyoeisha Chemical Co., Ltd.), 9 g of an acrylic oligomer ("BPE500" manufactured by SHIN-NAKAMURA CHEMICAL CO., LTD.) and 1 g of paraffin wax (manufactured by NIPPON SEIRO CO., LTD.) were heated to 70° C. with stirring and mixing, and after the paraffin wax was melted, the mixture was cooled to 25° C. Then, 13 g of NBR rubber ("DN612P" manufactured by ZEON CORPORATION) was mixed and dissolved, and 1 g of CIT (citric acid), 0.2 g of PSN (phenothiazine), 2 g of JPA (2-hydroxyethyl methacrylate phosphate), 0.2 of vanadyl acetylacetonate ("VoAA" manufactured by SHINKOH KAGAKU LTD.) and 0.5 g of polyethyleneimine ("EPOMIN SP-300" manufactured by NIPPON SHOKUBAI CO., LTD., number average molecular weight: 300, amine value: 21 mmol/g-solid) were added, followed by mixing and stirring to obtain an agent Q.

Preparation of Test Specimen and Evaluation Results (Room Temperature Bonding Test)
From a double barreled coating gun provided with a static mixer (manufactured by Denki Kagaku Kogyo Kabushiki Kaisha) in which the above agents P and Q were put, about 0.5 g of the mixture was flatly applied to a portion to be bonded of a test specimen in an atmosphere at 23° C. under a relative humidity of 50%, the coated surface was immediately bonded to the other test specimen, and the bonding time was measured, whereupon it was 20 seconds.
(Low Temperature Bonding Test)
A double barreled coating gun provided with a line mixture (manufactured by Denki Kagaku Kogyo Kabushiki Kaisha) in which the above agents P and Q were put, and iron test specimens were left to stand in a low temperature chamber at −30° C. one day, and then the agents were applied to test specimens and the test specimens were bonded. As a result, they were bonded in about one minute. After curing for one day, the temperature was returned to 23° C., and the shear strength was measured, whereupon it was 20 MPa.

Example 2

Preparation of Agent P

The agent P was obtained in the same manner as in Example 1.

Preparation of Agent R (Components A and D)

25 g of 2-hydroxyethyl methacrylate ("LIGHT ESTER HO" manufactured by Kyoeisha Chemical Co., Ltd.), 17 g of 2-hydroxypropyl methacrylate ("LIGHT ESTER HOP" manufactured by Kyoeisha Chemical Co., Ltd.), 35 g of phenoxyethyl methacrylate ("LIGHT ESTER PO" manufactured by Kyoeisha Chemical Co., Ltd.), 9 g of an acrylic oligomer ("BPE500" manufactured by SHIN-NAKAMURA CHEMI- CAL CO., LTD.) and 1 g of paraffin wax (manufactured by NIPPON SEIRO CO., LTD.) were put and heated to 70° C. with stirring and mixing, and after the paraffin wax was melted, the mixture was cooled to 25° C. Then, 13 g of NBR rubber ("DN612P" manufactured by ZEON CORPORATION) was mixed and dissolved, and 1 g of CIT (citric acid), 0.2 g of PSN (phenothiazine), 2 g of JPA (2-hydroxyethyl methacrylate phosphate) and 0.2 of vanadyl acetylacetonate ("VoAA" manufactured by SHINKOH KAGAKU LTD.) were added, followed by mixing and stirring to obtain an agent R.

Preparation of Agent S (Component D)

Polyethyleneimine was used as the agent S. For coating, the polyethyleneimine was injected into a 10 ml polypropylene syringe, and a very small amount of the polyethyleneimine was applied from the needle point.

(Preparation of Test Specimen and Evaluation Results)

A primer in an amount of about 0.001 g was applied to portions in the vicinity of both ends of a portion to be bonded of one test specimen in an atmosphere at 23° C. under a relative humidity of 50%. Then, from a double barreled coating gun provided with a static mixer in which the above agents P and R were put, the agents were flatly applied on the other test specimen, and both the test specimens were bonded, and the bonding time was measured, whereupon it was 15 seconds. After curing for one day, the iron/iron shear strength was 18 MPa. Further, the minimum time at which the maximum strength of 18 MPa was obtained was 30 minutes.

Example 3

Temporarily Fixing Effect Confirmation Test

The above agent S in an amount of about 0.001 g was applied by dot coating to a large iron block for a test (200 g) (25×45×20 mm) in an atmosphere at 23° C. under a relative humidity of 50%, and then, from a double barreled coating gun provided with a static mixer in which the above agents P and R were put, the agents were flatly applied to the other small iron block for a test (50 g) (25×25×8 mm). The small iron block for a test was bonded to the upright large iron block for a test in a vertical direction, whereupon a temporarily fixing effect by which no misalignment in the position occurred by its own weight was confirmed in 10 seconds.

Comparative Example 1

With a curable composition having the composition in Example 1 from which polyethyleneimine was removed, an increase in the viscosity was confirmed one minute later but the composition was still in the form of a liquid even 5 minutes later, and the composition became a solid 10 minutes later.

Comparative Example 2

From a double barreled coating gun provided with a static mixer (manufactured by Denki Kagaku Kogyo Kabushiki Kaisha) in which the agents P and R obtained in Example 2 were put, the agents were flatly applied to two iron test specimens, and they were bonded and as a result, the bonding time was 12 minutes.

Comparative Example 3

From a double barreled coating gun provided with a static mixer in which the above agents P and R were put, the agents were flatly applied to a small iron block for a test (50 g) (25×25×8 mm), and the small iron block for a test was bonded to an upright non-treated large iron block for a test in a vertical direction, whereupon misalignment in the position by its own gravity occurred even within 5 minutes.

Examples 4 and 5 and Comparative Examples 4 and 5

Materials as identified in Table 1 were mixed in a composition as identified in Table 1, and a temporarily fixing effect confirmation test was carried out in accordance with the method in Example 3. The results are shown in Table 1.

(Temporarily Fixing Effect Confirmation Test)

The above agent S in an amount of about 0.001 g was applied by dot coating to a large iron block for a test (200 g) (25×45×20 mm) in an atmosphere at 23° C. under a relative humidity of 50%, and then, from a double barreled coating gun provided with a static mixer in which the above agents P and R were put, the agents were flatly applied to the other small iron block for a test (50 g) (25×25×8 mm). The small iron block for a test was bonded to the upright large iron block for a test in a vertical direction, and the time at which no misalignment by its own weight occurred was measured.

TABLE 1

| | | Agent P | g | Agent R | g | Agent S | Temporarily fixing effect conformation test |
|---|---|---|---|---|---|---|---|
| Ex. 4 | Composition | — | 48 | Methyl methacrylate | 48 | Polyethyleneimine | ○ (10 seconds) |
| | | 2-Hydroxypropyl methacrylate | 17 | 2-Hydroxypropyl methacrylate | 17 | | |
| | | Phenoxyethyl methacrylate | 16 | Phenoxyethyl methacrylate | 16 | | |
| | | Dicyclopentenyloxyethyl methacrylate | 16 | Dicyclopentenyloxyethyl methacrylate | 16 | | |
| | | Paraffin wax | 0.5 | Paraffin wax | 0.5 | | |
| | | NBR rubber | 20 | NBR rubber | 20 | | |
| | | Citric acid | 3 | Citric acid | 3 | | |
| | | p-Benzoquinone | 0.05 | 2-Hydroxyethyl methacrylate phosphate | 0.3 | | |
| | | Cumene hydroperoxide | 4.8 | Ethylene thiourea | 1.05 | | |
| Comp. Ex. 4 | | Methyl methacrylate | 48 | Methyl methacrylate | 48 | — | Misalignment in the position occurred |
| | | 2-Hydroxypropyl methacrylate | 17 | 2-Hydroxypropyl methacrylate | 17 | | |
| | | Phenoxyethyl methacrylate | 16 | Phenoxyethyl methacrylate | 16 | | |
| | | Dicyclopentenyloxyethyl methacrylate | 16 | Dicyclopentenyloxyethyl methacrylate | 16 | | |
| | | Paraffin wax | 0.5 | Paraffin wax | 0.5 | | |
| | | NBR rubber | 20 | NBR rubber | 20 | | |
| | | Citric acid | 3 | Citric acid | 3 | | |
| | | p-Benzoquinone | 0.05 | 2-Hydroxyethyl methacrylate phosphate | 0.3 | | |
| | | Cumene hydroperoxide | 4.8 | Ethylene thiourea | 1.05 | | |

TABLE 1-continued

| | Agent P | g | Agent R | g | Agent S | Temporarily fixing effect conformation test |
|---|---|---|---|---|---|---|
| Ex. 5 | 2-Hydroxyethyl methacrylate | 25 | 2-Hydroxyethyl methacrylate | 25 | N,N-dimethylaniline | ○ |
| | 2-Hydroxypropyl methacrylate | 17 | 2-Hydroxypropyl methacrylate | 17 | | (20 seconds) |
| | Phenoxyethyl methacrylate | 35 | Phenoxyethyl methacrylate | 35 | | |
| | Acrylic oligomer | 9 | Acrylic oligomer | 9 | | |
| | Paraffin wax | 1 | Paraffin wax | 1 | | |
| | NBR rubber | 13 | NBR rubber | 13 | | |
| | Citric acid | 1 | Citric acid | 1 | | |
| | p-Benzoquinone | 0.05 | Phenothiazine | 0.2 | | |
| | Cumene hydroperoxide | 5 | 2-Hydroxyethyl methacrylate phosphate | 2 | | |
| | | | Vanadyl acetylacetonate | 0.2 | | |
| Comp. Ex. 5 | 2-Hydroxyethyl methacrylate | 25 | 2-Hydroxyethyl methacrylate | 25 | — | Misalignment in the position occurred |
| | 2-Hydroxypropyl methacrylate | 17 | 2-Hydroxypropyl methacrylate | 17 | | |
| | Phenoxyethyl methacrylate | 35 | Phenoxyethyl methacrylate | 35 | | |
| | Acrylic oligomer | 9 | Acrylic oligomer | 9 | | |
| | Paraffin wax | 1 | Paraffin wax | 1 | | |
| | NBR rubber | 13 | NBR rubber | 13 | | |
| | Citric acid | 1 | Citric acid | 1 | | |
| | p-Benzoquinone | 0.05 | Phenothiazine | 0.2 | | |
| | Cumene hydroperoxide | 5 | 2-Hydroxyethyl methacrylate phosphate | 2 | | |
| | | | Vanadyl acetylacetonate | 0.2 | | |

*Containing other additives

INDUSTRIAL APPLICABILITY

With the curable composition, the adhesive and the bonding method using it of the present invention, (1) a drawback of a conventional acrylic adhesive of poor instantaneous bonding properties is removed, whereby favorable initial fixing properties can be obtained. (2) A jig for position fixing is no longer necessary, and the time required for main curing can be shortened as compared with a conventional case, whereby the time until the composition is in a completely cured state, required by shipping of assembled products, can be shortened, and the line efficiency will be improved. Accordingly, the productivity can be improved, for example, in various industrial fields such as production of the furniture made of a steel plate or office articles, and the present invention is thereby industrially useful.

The entire disclosure of Japanese Patent Application No. 2007-052221 filed on Mar. 2, 2007 including specification, claims, and summary, is incorporated herein by reference in its entirety.

The invention claimed is:

1. A curable composition, comprising:
    (A) a polymerizable acrylic monomer;
    (B) cumene hydroperoxide;
    (C) a reducing agent comprising vanadium or copper, or a reducing agent comprising ethylene thiourea; and
    (D) a basic compound having a primary, secondary, or tertiary amine structure.

2. The curable composition of claim 1, wherein the component (A) is a mixture of a hydroxyalkyl (meth)acrylate and a phenoxyalkyl (meth)acrylate.

3. The curable composition of claim 1, wherein the basic compound as the component (D) is a compound having a main chain with an ethyleneimine skeleton.

4. The curable composition of claim 1, wherein the basic compound as the component (D) is a polyethyleneimine having a number average molecular weight of from 50 to 70,000.

5. The curable composition of claim 1, comprising:
    100 parts by mass of the component (A);
    from 0.1 to 10 parts by mass of the component (B);
    from 0.04 to 5 parts by mass of the component (C); and
    from 0.5 to 10 parts by mass of the component (D).

6. The curable composition of claim 1, further comprising:
    from 5 to 40 parts by mass of an elastomer as a component (E) per 100 parts by mass of a total of the component (A) and the component (E).

7. A bonding method employing the curable composition of claim 1, which comprises:
    applying either agent P comprising the components (A) and (B) or agent Q containing the components (A), (C), and (D) on a surface of one object to be bonded;
    applying the other of the agent P or the agent Q on a surface of a second object to be bonded;
    contacting both surfaces; and then
    curing.

8. A bonding method employing the curable composition of claim 1, which comprises:
    applying an agent P comprising the components (A) and (B) and an agent R comprising the components (A) and (C) on a first surface of one object to be bonded;
    applying an agent S comprising the component (D) on either the first surface or a surface of a second object to be bonded;
    contacting both surfaces; and then
    curing.

9. An assembly, which is produced by bonding surfaces of two objects by the bonding method of claim 8, wherein the surfaces are made of copper.

10. The curable composition of claim 2, wherein the basic compound as the component (D) is a compound having a main chain with an ethyleneimine skeleton.

11. The curable composition of claim 2, wherein the basic compound as the component (D) is a polyethyleneimine having a number average molecular weight of from 50 to 70,000.

12. The curable composition of claim 2, comprising:
    100 parts by mass of the component (A);
    from 0.1 to 10 parts by mass of the component (B);
    from 0.04 to 5 parts by mass of the component (C); and
    from 0.5 to 10 parts by mass of the component (D).

13. The curable composition of claim 3, comprising:
    100 parts by mass of the component (A);
    from 0.1 to 10 parts by mass of the component (B);
    from 0.04 to 5 parts by mass of the component (C); and
    from 0.5 to 10 parts by mass of the component (D).

14. The curable composition of claim 4, comprising:
100 parts by mass of the component (A);
from 0.1 to 10 parts by mass of the component (B);
from 0.04 to 5 parts by mass of the component (C); and
from 0.5 to 10 parts by mass of the component (D).

15. The curable composition of claim 2, wherein the hydroxyalkyl meth(acrylate) is at least one selected from the group consisting of 2-hydroxyethyl meth(acrylate), 2-hydroxypropyl meth(acrylate), 3-hydroxypropyl meth(acrylate), and 4-hydroxybutyl meth(acrylate).

16. The curable composition of claim 2, wherein the phenoxyalkyl meth(acrylate) is at least one selected from the group consisting of phenoxyethyl meth(acrylate), phenoxypropyl meth(acrylate), and phenoxybutyl meth(acrylate).

17. The curable composition of claim 15, wherein the phenoxyalkyl meth(acrylate) is at least one selected from the group consisting of phenoxyethyl meth(acrylate), phenoxypropyl meth(acrylate), and phenoxybutyl meth(acrylate).

18. The curable composition of claim 2, wherein a mixing ratio of the hydroxyalkyl meth(acrylate) to the phenoxyalkyl meth(acrylate) is 5 to 80:95 to 20, by mass.

19. The curable composition of claim 2, wherein a mixing ratio of the hydroxyalkyl meth(acrylate) to the phenoxyalkyl meth(acrylate) is 10 to 60:90 to 40, by mass.

20. The curable composition of claim 1, wherein the component (C) is at least one selected from the group consisting of vanadyl acetylacetonate, copper naphthenate, and ethylene thiourea.

* * * * *